United States Patent [19]

Summerfield et al.

[11] Patent Number: 5,152,169

[45] Date of Patent: Oct. 6, 1992

[54] GAS TURBINE ENGINE THRUST MEASUREMENT

[75] Inventors: Leslie R. Summerfield, Bristol, England; John D. Gay, Gwent, Wales

[73] Assignee: Rolls-Royce plc, London, England

[21] Appl. No.: 685,727

[22] Filed: Apr. 16, 1991

[30] Foreign Application Priority Data

Apr. 21, 1990 [GB] United Kingdom ............... 9009014
May 16, 1990 [GB] United Kingdom ............... 9011039

[51] Int. Cl.$^5$ ............................................ G01M 15/00
[52] U.S. Cl. .................................................. 73/117.4
[58] Field of Search ............... 73/117.4, 113; 340/945, 340/959, 971; 364/431.02

[56] References Cited

U.S. PATENT DOCUMENTS 3,107,525  10/1963  Murray ............................... 73/117.4

FOREIGN PATENT DOCUMENTS 1269478  4/1972  United Kingdom .

Primary Examiner—Jerry W. Myracle
Attorney, Agent, or Firm—Oliff & Berridge

[57] ABSTRACT

The thrust produced by a gas turbine engine can be calculated from the rate at which fuel is consumed by the engine. At a constant air temperature and pressure the thrust produced by the engine is proportional to the rate of fuel consumption.

6 Claims, 1 Drawing Sheet

GAS TURBINE ENGINE THRUST MEASUREMENT

FIELD OF THE INVENTION

This invention relates to gas turbine engine thrust measurement, particularly in aircraft gas turbine engines.

It is desirable to be able to measure the thrust of a gas turbine engine because the thrust produced by the engine can be used as a measure of its mechanical condition, engines could, for example, be serviced when their maximum thrust drops below some specified level. Additionally before an aircraft takes off it would be useful to measure the thrust being produced by its engines in order to ensure that this is enough to allow a safe take off and flight.

DESCRIPTION OF THE PRIOR ART

It is easy to measure the thrust of a gas turbine engine running on a test bed by using a strain gauge for example, however, it has proved very difficult to measure the thrust produced by a gas turbine engine when installed on an aircraft.

It has been attempted in the past to produce systems which measure parameters such as the pressure and temperature at various points in the engine and the speed of rotation of the or each spool in the engine, such systems are generally complex and are not very satisfactory because of the large random variations in these parameters which occur within the engine. These variations make it very difficult to relate the simultaneous values of different parameters or the same parameter at two different points in the engine in order to calculate the thrust being produced by the engine, and as a result the derivation of thrust is complex and unreliable.

BRIEF SUMMARY OF THE INVENTION

This invention was intended to produce a simpler method of finding the thrust of a gas turbine engine.

In a first aspect this invention provides a method of gas turbine engine thrust measurement in which the thrust produced by the engine is calculated from the rate at which fuel is burnt by the engine.

In a second aspect this invention provides a method for calculating whether or not a gas turbine engine is producing an acceptable amount of thrust employing, a graph having the rate at which fuel is consumed by the engine plotted on one axis and ambient air temperature plotted on the other axis and divided into an acceptable thrust area and a number of unacceptable thrust areas.

In a third aspect this invention provides apparatus for calculating the thrust produced by a gas turbine engine comprising; a processor, a fuel flow meter providing a signal describing the rate of fuel flow into the engine to the processor, an air pressure sensing means supplying a signal giving the air pressure value to the processor and a thermometer supplying a signal giving the air temperature value to the processor, the processor being arranged to operate on said signals to calculate the thrust produced by the engine.

It has been found that the thrust produced by each design of gas turbine engine in a steady state condition is proportional to the rate at which fuel is burnt within the engine provided the air pressure and temperature on entering the engine is constant. Furthermore this ratio is largely unaffected by wear or minor damage to the engine, the reduction in thrust caused by wear or minor damage being matched by a reduction in the rate at which fuel is burnt.

The relationship between thrust and the rate of fuel burning will generally be different for different engine designs and may be different for engines of the same design in different airframes having different air intakes.

Accordingly, once the relationship between thrust and rate of fuel burning at a given air temperature and pressure is known it is possible to calculate the thrust of an engine at that air temperature and pressure by simply multiplying the rate at which fuel is supplied to the engine by the appropriate constant. Indeed if all that is required is a measure of whether the engine is producing enough thrust for a safe take off it is not even necessary to do this, all that is required is to check that the fuel flow rate is within a band corresponding to a band of acceptable engine thrust levels.

In reality temperature and pressure will not remain constant so rather than a simple multiplication by a constant a formula including pressure and temperature terms must be used. This formula can be obtained by running an engine on a test bed in varying conditions and measuring the thrust produced.

BRIEF DESCRIPTION OF THE SEVERAL VIEW OF THE DRAWING

The present invention will now be more particularly described by way of example only with reference to the accompanying diagrammatic drawings in which;

FIG. 1 shows a graph which can be used to calculate whether an aircraft gas turbine engine is producing an acceptable amount of thrust, and FIG. 2 shows a system for calculating whether an aircraft gas turbine engine is producing an acceptable amount of thrust.

DETAILED DESCRIPTION

Figure 1:
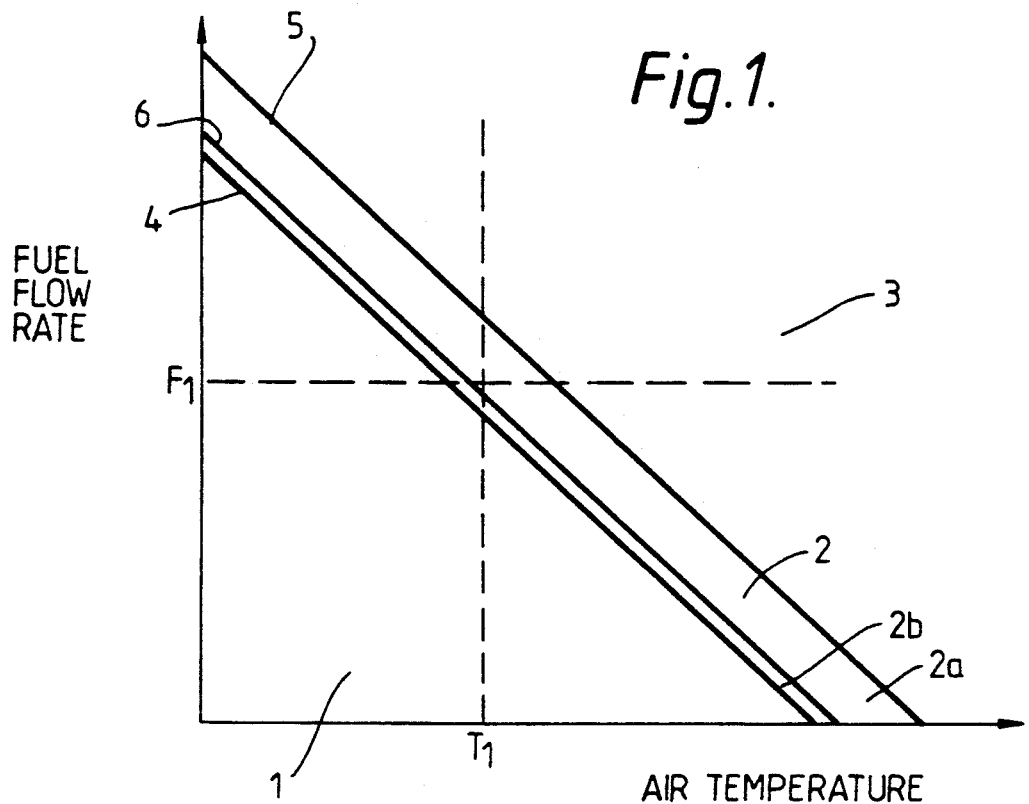

Referring to FIG. 1 a graph of air temperature against fuel flow rate is shown. This graph is divided into three regions 1, 2 and 3 by two lines 4 and 5. The lines 4 and 5 are the loci of the minimum and maximum acceptable fuel flow rates over a range of temperatures respectively. The graph is plotted for the fuel flow rates with the engine at maximum power and stationary at ground level.

The region 1 below the line 4 corresponds to engine thrusts that are unacceptably low. The region 2 between the lines 4 and 5 corresponds to acceptable engine thrusts and the region 3 above the line 5 corresponds to unacceptably high engine thrusts.

Generally an unacceptably low engine thrust will indicate that the engine is worn or damaged while an unacceptably high calculated thrust generally means that there is a fault in either the fuel meter or the temperature sensor or the engine is operating outside its normal limits.

In use the pilot would prepare the aircraft for take off. When the aircraft was stationary at the end of the runway with its engine at full power the pilot would take the fuel flow rate and air temperature reading from his instruments and looking at the graph of FIG. 1 decide where the point corresponding to these two values was.

If the point corresponding to the fuel flow rate and temperature values is in the regions 1 or 3 take off will be aborted because this will show that there is a fault in either the engine or the instruments.

If the point corresponding to the fuel flow rate and temperature values is in the region 2 the pilot can proceed to take off knowing that he has sufficient engine thrust available.

A third line 6 could be positioned between the lines 4 and 5 to divide the region 2 into two parts 2a and 2b. In this case, if the point corresponding to the fuel flow rate and the temperature is in the lower part 2b of the region 2 the pilot will proceed with take off but will later report that the engine was producing a thrust in this region so that appropriate maintenance action may be taken.

Each graph of the type shown in FIG. 1 will only be correct for one specific air pressure, so it would be necessary to either produce a separate graph for each airfield or group of airfields at the same height above sea level or to provide a conversion table to allow the scales of a single graph to be converted for use at a number of different heights above sea level. In general variations in atmospheric pressure due to weather will be relatively small and can be ignored.

Since the aircraft is stationary the air pressure and temperature on entering the engine will be the ambient air presure and temperature.

Figure 2:
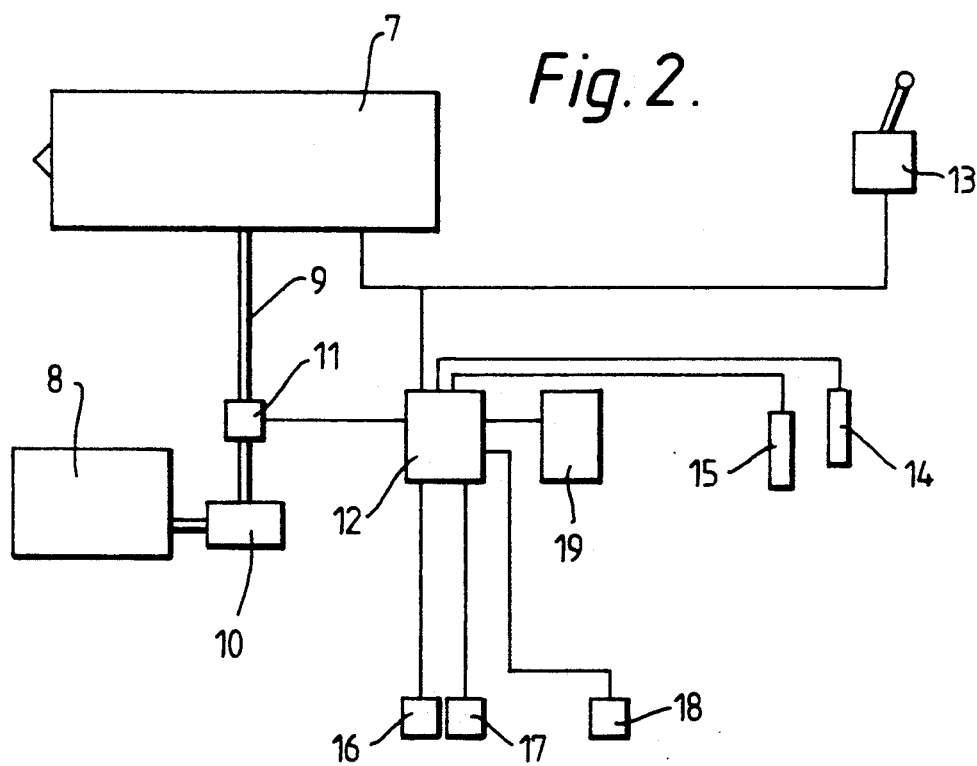

An automatic system for sensing engine thrust is shown in FIG. 2.

A gas turbine engine 7 is supplied with fuel from a tank 8 by a pump 10 which pumps the fuel along a pipe 9. A fuel flow meter 11 measures the rate at which fuel flows along the pipe 9 and into the engine and produces an electrical signal dependent on this rate of flow. This signal is supplied to a processor 12.

The power level of the engine 7 is controlled by a throttle 13, and a signal giving the throttle setting is also supplied to the processor 12. On each flight, the first time full power is selected on the throttle 13, which will be when the engine 7 is run-up for take off, the processor 12 delays a short period for the engine 7 to reach full power and then, provided that the throttle 13 is still at full power, takes the fuel flow rate signal from the meter 11 and air pressure and temperature readings from a barometric pressure sensor 14 and a thermometer 15 respectively. This short delay before taking all of the reading is necessary because in gas turbine engines there is always a delay between a new throttle position being set and the engine reaching a steady state at the new power level. The length of the delay needed will depend on the design of the engine.

The processor 12 operates on the reading from the fuel flow meter 11, pressure sensor 14 and thermometer 15 in accordance with an algorithm to derive a result that the fuel flow, and therefore the thrust, is too high, too low or acceptable.

If the fuel flow is too low the thrust produced by the engine 7 is too low to allow safe take off, so the processor 12 switches on an engine fault indicator light 16 on the instrument panel, warning the pilot not to attempt take off.

If the fuel flow is acceptable the thrust produced by the engine 7 is sufficient for a safe take off, so the processor 12 switches on an engine acceptable indicator light 17 on the instrument panel clearing the pilot to attempt take off.

If the fuel flow is too high, the engine 7 may be operating outside its normal limits or it may not have settled to a steady state or the fuel flow meter 11, pressure sensor 14 or thermometer 15 may have provided a false reading to the processor 12 for some reason. If the engine 7 has not settled to a steady state a further delay may allow it to do so, and if the meter 11, sensor 14 or thermometer 15 has given a false reading it may not do so again if the reading is re-taken. So the processor 12 checks that the throttle 13 is still at full power and then takes fresh readings from the meter 11 pressure sensor 14 and thermometer 15 and operates on them again using the same algorithm. If the new result is that the fuel flow is too low or acceptable the processor takes the action described above and switches on one of the lights 16 and 17. If the new result is again that the fuel flow is too high the processor 12 switches on an instrumentation failure or engine overated indicator light 18 on the instrument panel, warning the pilot not to take off.

If the fuel flow is acceptable by less than a pre-set amount the processor 12 switches on the light 17 but also places a low thrust message in a memory 19. The memory 19 is checked by maintenance personnel after each flight and if a low thrust message is found appropriate maintenance action is taken.

The system described could be arranged to provide an actual thrust value to the pilot by employing the appropriate algorithm and having the product of this algorithm displayed on a numerical display on the instrument panel. This might be desirable if the minimum thrust required for take off varied due to some further parameter such as weather conditions, payload or runway length.

The system shown in FIG. 2 can be used to measure engine thrust in flight with a few alterations. As explained above the relationship between thrust and rate of fuel burning varies with the air temperature and pressure at entry to the engine 7. When the take off thrust sensor of FIG. 2 is used the aircraft is stationary so the ambient air temperature and pressure is the air temperature and pressure of the air entering the engine 7, however in flight the temperature and pressure of the air entering the engine 7 will be different from the ambient air temperature and pressure because of the ram effect of the movement of the aircraft through the air.

In order to find the temperature and pressure of air entering the engine 7 the thermometer 15 is positioned in the airflow just in front of the engine 7, while the barometric pressure sensor 14 is replaced with a pressure sensor positioned in the airflow just in front of the engine 7.

The processor 12 can be set to take measurements each time full throttle is selected in flight, alternatively some other trigger such as a pre-set time or a command from the pilot could be used.

Each time the processor 12 is instructed to take measurements it carries out the sequence of actions described above, to inform the pilot whether or not the engine7 is still functioning correctly.

Aircraft do not usually operate for long periods at full throttle in flight, so it may be preferred to monitor the performance of the engine 7 by measuring the thrust it produces in some other condition such as cruise for example. This would require the use of a different algorithm because the relationship between fuel flow, air temperature and pressure and thrust will generally vary across the power range of an engine.

It may not be necessary to employ a pressure sensor in the airflow just in front of the engine 7, most aircraft already use a barometric pressure sensor for use as an altimeter and a pitot device measuring the difference between barometric and total pressure to determine airspeed, where available the signals from these two sensors could be used by the processor 12 to calculate the pressure of the air entering the engine 7.

Instead of using an algorithm the processor 12 could employ look up tables to decide whether or not the fuel flow rate was acceptable.

All of the thrust measurement methods described could be used in a multi-engined aircraft by either measuring the total fuel flow and deriving the total thrust or by measuring the fuel flow of each engine separately and deriving the thrust of each engine separately.

We claim:

1. A method of gas turbine engine thrust measurement in which the thrust produced by the engine is calculated from the rate at which fuel is burnt by the engine, the calculated thrust being corrected to account for ambient pressure and temperature to obtain a true thrust.

2. A method as claimed in claim 1 in which the absolute value of the true thrust produced by the engine is calculated.

3. A method as claimed in claim 1 in which it is calculated whether or not the true thrust produced by the engine is within a range of acceptable thrusts.

4. A method for calculating whether or not a gas turbine engine is producing an acceptable amount of thrust employing, a graph having the rate at which fuel is consumed by the engine plotted on one axis and ambient air temperature plotted on the other axis and divided into an acceptable thrust area and a number of unacceptable thrust areas.

5. A method as claimed in claim 4 where a number of graphs are employed, each being used at a separate value of ambient air pressure.

6. Apparatus for calculating the thrust produced by a gas turbine engine comprising; a processor, a fuel flow meter providing a signal describing the rate of fuel flow into the engine to the processor, an air pressure sensing means supplying a signal giving the air pressure value to the processor and a thermometer supplying a signal giving the air temperature value to the processor, the processor being arranged to operate on said signals to calculate the thrust produced by the engine.

* * * * *